US00RE37041E

(19) United States
(12) Reissued Patent
Koyama et al.

(10) Patent Number: US RE37,041 E
(45) **Date of Reissued Patent: *Feb. 6, 2001**

(54) VOICE PROCESSOR

(75) Inventors: Hirohisa Koyama, Machida; Takeshi Bushida, Oume, both of (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

(21) Appl. No.: 08/918,869

(22) Filed: Aug. 26, 1997

(Under 37 CFR 1.47)

Related U.S. Patent Documents

Reissue of:
(64) Patent No.: 5,446,238
Issued: Aug. 29, 1995
Appl. No.: 08/266,151
Filed: Jun. 27, 1994

U.S. Applications:

(63) Continuation of application No. 08/040,561, filed on Mar. 31, 1993, now abandoned, which is a continuation of application No. 07/710,586, filed on Jun. 5, 1991, now abandoned.

(30) Foreign Application Priority Data

Jun. 8, 1990 (JP) ..... 2-150256
Jun. 8, 1990 (JP) ..... 2-150257

(51) Int. Cl.[7] ..... G01H 1/38

(52) U.S. Cl. ..... 84/669; 84/DIG. 22

(58) Field of Search ..... 84/600, 603, 609–614, 84/616, 622–625, 634–638, 645, 650–652, 654, 660, 664, 666–669, DIG. 22, 453, 454, 619, 657, 445

(56) References Cited

U.S. PATENT DOCUMENTS

| | | | | |
|---|---|---|---|---|
| 4,463,650 | | 8/1984 | Rupert . | |
| 4,771,671 | | 9/1988 | Hoff, Jr. . | |
| 4,915,001 | | 4/1990 | Dillard . | |
| 4,926,737 | | 5/1990 | Minanutaka . | |
| 4,991,484 | * | 2/1991 | Kawashima | 84/454 X |
| 5,014,586 | | 5/1991 | Sakashita . | |
| 5,038,658 | | 8/1991 | Tsuruta et al. . | |

FOREIGN PATENT DOCUMENTS

| | | |
|---|---|---|
| 56-168698 | 12/1981 | (JP) . |
| 0582893 | 1/1983 | (JP) . |
| 59-200299 | 4/1984 | (JP) . |
| 59-116696 | 7/1984 | (JP) . |
| 59-126294 | 8/1984 | (JP) . |
| 62-65098 | 3/1987 | (JP) . |
| 63-174096 | 7/1988 | (JP) . |
| 63-36400 | 9/1988 | (JP) . |

* cited by examiner

*Primary Examiner*—Stanley J. Witkowski
(74) *Attorney, Agent, or Firm*—Pillsbury Madison & Sutro LLP

(57) ABSTRACT

The voice processor includes a microphone for a device for inputting a voice signal, a device for inputting chord information from an electronic musical instrument or the like, a converter for converting the pitch of the voice signal into a specified pitch according to the chord information, a mixer for mixing the input voice signal and a pitch-converted voice signal, and a loudspeaker for outputting the mixed signal. The pitch of the input voice signal is converted into such one as will be consonant with the chord information or as will coincide therewith and thereafter the pitch converted signal will be output along with the input voice signal.

46 Claims, 2 Drawing Sheets

VOICE PROCESSOR

Matter enclosed in heavy brackets [ ] appears in the original patent but forms no part of this reissue specification; matter printed in italics indicates the additions made by reissue.

This is a continuation of application Ser. No. 08/040,561, filed Mar. 31, 1993, now abandoned which is a file wrapper continuation of application Ser. No. 07/710,586 filed on Jun. 5, 1991, now abandoned.

BACKGROUND OF THE INVENTION

1. Field of the Invention

The present invention relates to a voice processor which is capable of producing sound effects by pitch conversion of voices.

2. Description of the Prior Art

By now, there have come into practical use electronic musical instruments so arranged that when a monotone melody is played, additional harmonic tones are automatically generated for simplifying the playing thereof. Also, there have been devices practically available which are adapted to convert the pitch of a voice to be generated for its output to thereby increase special impression of tones as well as entertaining features thereof.

However, in such electronic musical instruments adapted to generate additional tones in connection with a monotone melody as above, only a separate tone generator for additional tones is provided in addition to a tone generator (tone waveform shaping circuit) for melodies.

Moreover, a conventional device adapted to automatically make pitch conversion for its output has been arranged only such that an input voice is simply transposed up or down by a specified interval (5th above, 3rd below, etc.). Thus, to its disadvantages, the device would result in noticeable monotonous performance when used for a long melody or in a dissonance due to exclusion of harmony with chords when a chord is generated in addition to a melody tone.

SUMMARY OF THE INVENTION

Accordingly, it is an object of the present invention to provide a voice processor which has overcome the foregoing problems by being adapted to convert the pitch of an input voice according to a chord input.

A voice processor of the present invention comprises: voice input means for inputting a voice signal having a pitch; chord information input means for inputting chord information; pitch conversion means for converting an input voice signal inputted from the voice input means into a pitch-converted voice signal having a pitch different from the pitch of the input voice signal according to chord information inputted from the chord information input means and for outputting the pitch-converted voice signal.

According to the voice processor of the invention, a voice is input through the voice input means, which may be given by a microphone, a line input device, or the like. Chord information is input through the chord information input means. The chord information is such information that includes the types of chords (e.g. major, minor, seventh) and roots. This chord information input means may be given by a real-time playing instrument (e.g. keyboard), a chord sequencer that can previously store chordal progression, or the like.

The pitch of a voice input through the voice input means is converted into a pitch according to the chord information input through the chord information input means.

The above and other objects, features and advantages of the present invention will become more apparent from the following detailed description with reference to the accompanying drawings.

DESCRIPTION OF THE PREFERRED EMBODIMENT OF THE INVENTION

Figure 1:
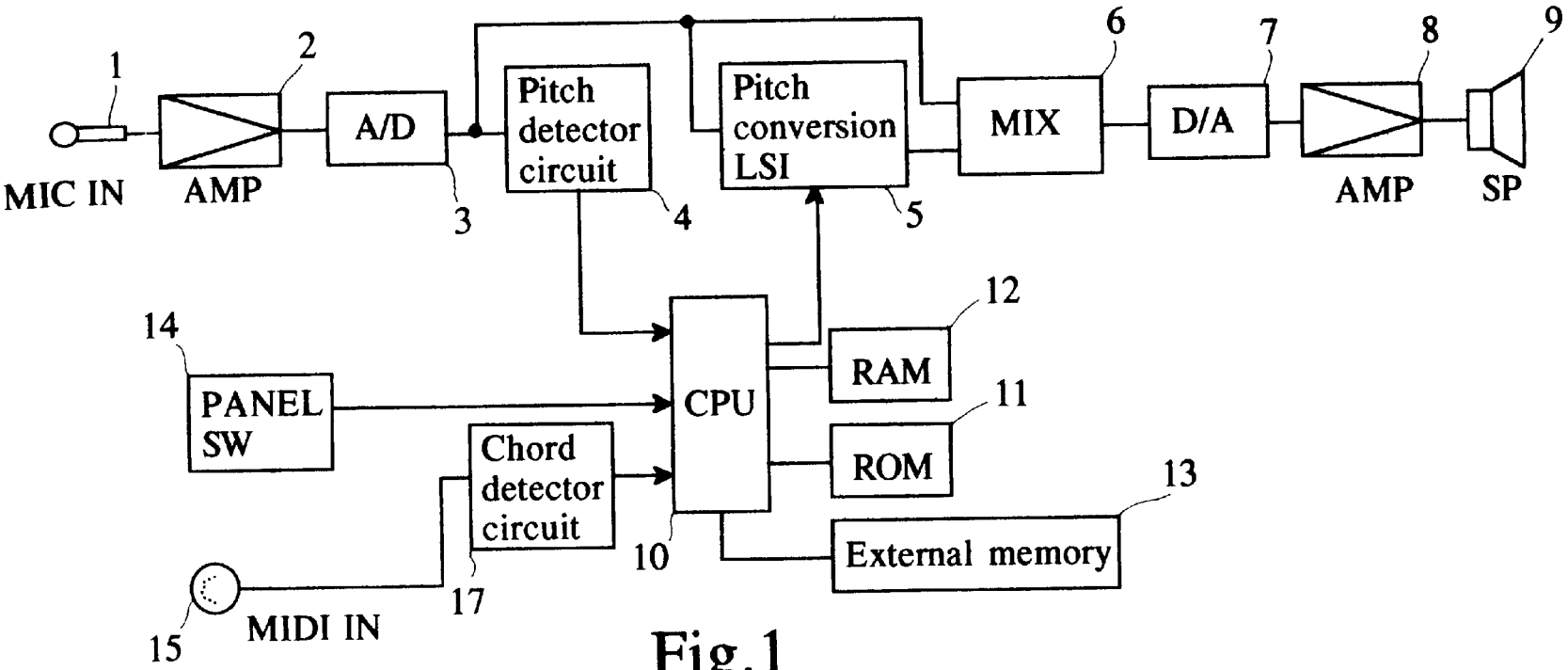
FIG. 1 is a block diagram of a voice processor embodying the present invention.

FIG. 1 is a block diagram of a voice processor embodying the present invention. This system is designed to pitch convert a voice input through a microphone 1 with a pitch conversion LSI 5 and thereafter put it out as mixed with the original voice by a mixer 6.

The main part of the system is made up of digital circuits. A voice input through the microphone 1 is amplified by an amplifier 2 and then converted into a digital signal by an A/D converter circuit 3. The digital signal converted by the A/D converter circuit 3 is fed to a pitch detector circuit 4, the pitch conversion LSI 5, and the mixer 6. The pitch detector circuit 4 and pitch conversion LSI 5 are connected to a CPU 10. Others, which include a ROM 11, a RAM 12, an external memory 13, a panel switch 14, and a MIDI input/output connectors 15,16, are also connected to the CPU 10. The ROM 11 has stored programs for processing input digital data. The external memory 13 is given by a floppy disk unit or a 'karaoke' system (the system of recorded instrumental music used to accompany live singing), where a floppy disk to be set to the unit has previously stored chord sequence data (data of chord progression). To the MIDI connector 15 is connected a playing instrument (electronic musical instrument) such as a keyboard, wherein from key data input therethrough, the type of chord and a root are detected by a chord detector circuit 17 and then chord information is fed to the CPU 10. The MIDI connector 15 is connected to an external device which is capable of generating a tone, e.g., tone generator. The pitch of a voice is detected by the pitch detector circuit 4, the resulting pitch information being fed to the CPU 10. The CPU 10 decides to what cents the pitch of the voice input through the microphone 1 should be converted, according to the chord information stored in the external memory 13 or input via the MIDI connector 15, then feeding the resulting parameter to the pitch conversion LSI 5. The pitch conversion LSI 5 converts the pitch of the voice according to the parameter fed from the CPU 10, where the pitch conversion is performed by such a known method that data is interpolated in accordance with a conversion ratio, the pitch conversion LSI 5 having contained therein buffer, clock, arithmetic circuit (not shown) for doing that.

The pitch-converted voice (harmony voice) is brought into the mixer 6. The mixer has also input voice (direct voice) that has been fed through the microphone 1 and digital converted. The mixer 6 adds these harmony and direct voices and feeds the result to a D/A converter circuit 7. The D/A converter circuit 7 digital-to-analog converts the added signal. The analog converted signal is amplified by an amplifier 8, thus output from a loud speaker 9.

Figure 2:
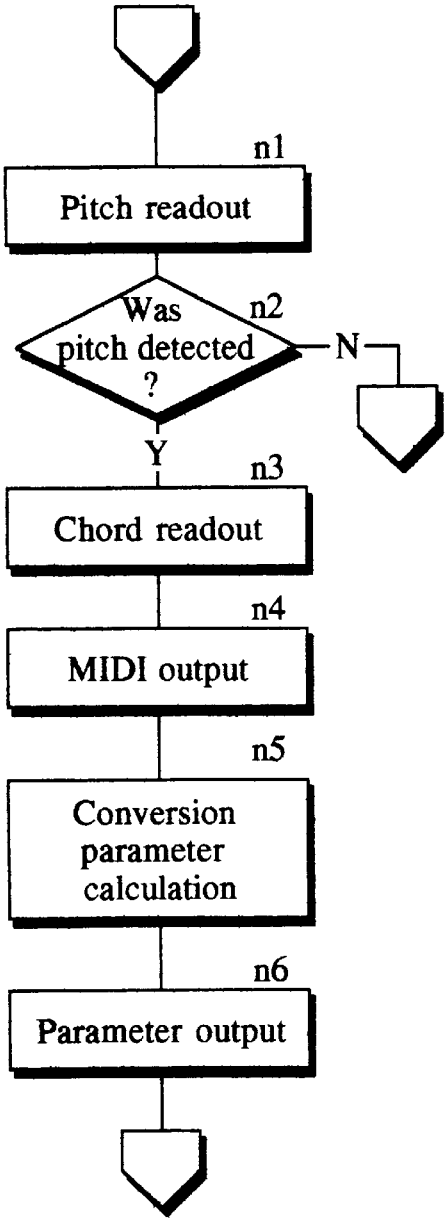
FIGS. 2 and 3 are flow charts showing operations of the same voice processor.
Figure 3:
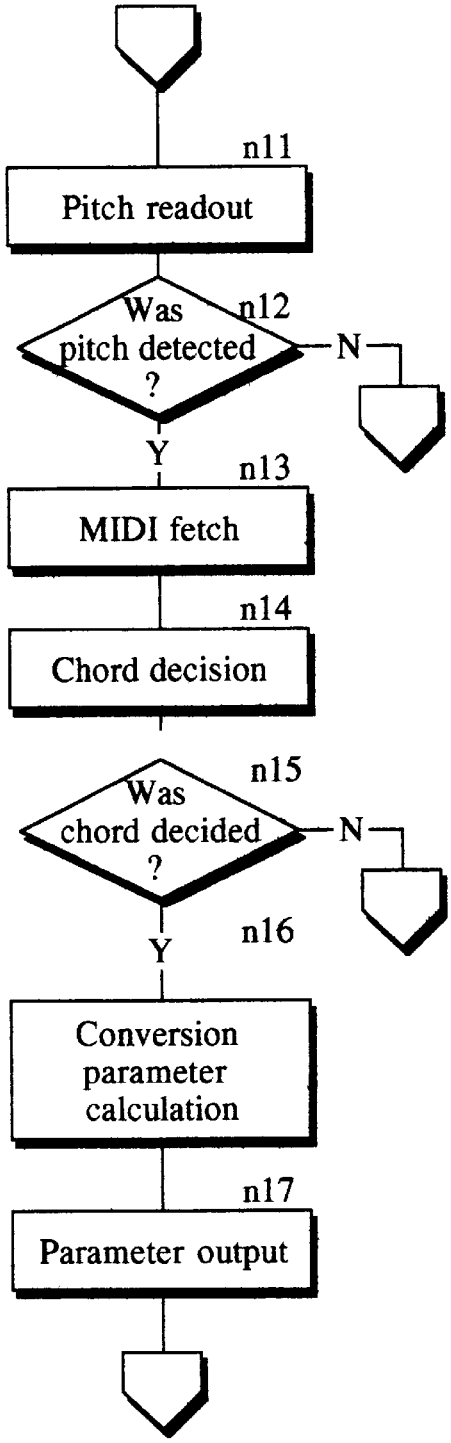

FIGS. 2 and 3 are flow charts showing operations of the CPU 10. The operation in FIG. 2 is that for feeding chord information from a chord sequencer (external memory 13), while the operation in FIG. 3 is that for feeding chord information (key data) from the playing instrument connected to the MIDI connector 15. These operations are to be performed every several milliseconds by the CPU 10.

In FIG. 2, first the buffer in the pitch detector circuit 4 is read (n1). When the pitch detector circuit 4 can detect the pitch of an input voice, the buffer stores the pitch. When not, or when there is no voice input, the buffer stores data for no pitch detection (FFH). For any pitch detection, the operation goes from step n2 to n3, while for no pitch detection, it returns to the initial step as it is. At step n3, a piece of chord information specified to the present (the timing the processor is carrying out) is read out from the external memory 13. This chord information is fed to the MIDI connector 16 (n4) to make an externally connected tone generator generate the resulting chord. Then the parameter for pitch conversion is calculated (n5) to tone generate such additional tones within the melody range as will be consonant with this chord. The pitch conversion is done in such a way that a pitch Of the input voice is converted into the one closest to an input voice out of pitches corresponding to chord component pitch names of the input chord within a melody range (intervals higher than an accompaniment range), but not the same pitch. For example, if the pitch of an input voice is C4 and the chord composing tones are G1, C2, and E2, then the pitches corresponding to chord composing pitch names within the melody range are G3, C4, and E4, resulting in selection of E4 as the pitch for the pitch conversion parameter. Such a parameter is fed to the pitch conversion LSI 5 (n6). The pitch conversion LSI 5, having received this parameter, converts the direct voice into a harmony voice. In the steps n5 and n6, which decides the parameter for converting the pitch of the input voice, another process may be carried out as follows. The parameter for pitch conversion is calculated so as to convert the [chord] *pitch* of the input voice into a chord composing tone for generating. The pitch conversion is done in such a way that a pitch is converted into one corresponding to a chord component pitch name of the input chord within an accompaniment range (intervals lower than a melody range). For example, if the chord composing tones are G1, C2, and E2, then the direct voice is converted into any of these tone pitches; in this case, [E4] *E2*, which is a three-degree tone, would reasonably be selected as the pitch conversion parameter. At step n6, this parameter is fed to the pitch conversion LSI 5. The pitch conversion LSI 5, having received this parameter, converts the direct voice into a harmony voice.

In FIG. 3, first the buffer in the pitch detector circuit 4 is read (n11). When a tone pitch is detected, the operation goes from step n12 to n13, while when not, the operation returns to the initial step as it is. At step n13, the chord currently played is read from the playing instrument (electronic musical instrument) connected with the MIDI connector 15. In this step, if the playing instrument is one that outputs chord information, the resulting chord information can be used as it is, while if the instrument is one that does not output chord information, the chord detector circuit 17 decides a chord according to the pattern of an input key depression and the like (n14). The method of deciding a chord can use such a conventionally known one that the pattern of an input key depression are applied to a table in which chord composing tones are stored or other methods of various types. When a chord has been detected, the parameter for pitch conversion is calculated so as to generate such additional tones as will be consonant with the chord within the melody range or to convert the direct voice into any of the tones composing the chord that has been detected (n15 to n16). This conversion method is the same as that described in regard to FIG. 2, explanation thereof omitted. The resulting parameter is fed to the pitch conversion LSI 5 (n17). The pitch conversion LSI 5, having received this parameter, converts the direct voice into a converted voice. Incidentally, the decided chord is already generated by the playing instrument (electronic musical instrument), and may not be output to MIDI connector 16 further. In addition, if a chord has not been detected at step n14, the pitch conversion cannot be performed, causing the operation to return directly from step n15.

Although the conversion method in this embodiment for determining the pitch of a harmony tone is such that the pitch is selected in connection with the range of direct input voices, it can otherwise be such that a pitch is converted into that of a tone which is a integral multiple of a root of a chord generated as an accompaniment tone (pitched approximately 2 octaves lower than a melody tone) irrespectively of the direct voice range, or other method of various types.

According to the voice processor of the present invention, since an input voice is converted into a harmony voice in accordance with an accompaniment chord, the result is not a simple pitch conversion but the one that enables such harmony voices to be generated as will be consonant with the accompaniment chord.

In addition, in the case where a direct voice is tone generated as it is converted into one of tones composing a chord within the accompaniment range, it can also be arranged that a plurality of pitch conversion LSIs 5 are provided in parallel so as to allow the direct voice to be converted at a time into all the tones composing the chord (root, 3-degree tone, 5-degree tone and, for a 7th chord, 7-degree tone). This arrangement will permit the chord to be tone generated only with the above device. Further, even in the case where only one of the chord composing tones is output, it can be arranged that the root, 3-degree tone, and 5-degree tone are switched over in short time intervals thereby to produce such an effect as arpeggio. Moreover, this effect can be realized also by such a device that can simultaneously output a plurality of chord composing tones (in a more complicated manner).

According to the voice processor of the present invention, since an input voice is converted into a harmony voice that is one of tones composing an accompaniment chord, such a harmony voice can be generated not as a simple tone conversion but as another in which the harmony voice can be utilized as an accompaniment chord.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A voice processor comprising:

voice input means for inputting a voice signal having a pitch;

chord information input means for inputting a chord;

pitch conversion means for converting the input voice signal into a pitch-converted voice signal having a pitch different from the pitch of the input voice signal, the pitch conversion means converting the pitch of the input voice signal in accordance with the input chord from the chord information input means and for outputting the pitch-converted voice signal; and means for combining the pitch-converted voice signal with the input voice signal to add sound effects thereto;

the chord information input means comprising play information input means for inputting playing information and chord detection means for detecting the input chord from playing information inputted by the play information input means.

2. A voice processor according to claim 1 further comprising, voice mixing means for mixing the input voice signal from the voice input means and the pitch-converted voice signal from the pitch conversion means and outputting a mixed voice signal.

3. A voice processor according to claim 1, wherein chord sequence data is input by the chord information input means as the input chord.

4. A voice processor comprising:

voice input means for inputting a voice signal having a pitch;

chord information input means for inputting chord information;

pitch conversion means for converting the input voice signal into a pitch-converted voice signal having a pitch different from the pitch of the input voice signal, the pitch conversion means converting the pitch of the input voice signal in accordance with the chord information from the chord information input means and outputting the pitch-converted voice signal, the pitch conversion means converting the input voice signal inputted from the voice input means consonant with the chord information; and means for combining the pitch-converted voice signal with the input voice signal;

the chord information input means comprising play information input means for inputting playing information and chord detection means for detecting the input chord information from playing information inputted by the play information input means.

5. A voice processor according to claim 4, wherein the pitch resulting from conversion by said pitch conversion means is a pitch closest to the pitch of the voice signal input to said voice input means out of pitches corresponding to chord composing pitch names of said chord information within a melody range.

6. A voice processor comprising:

voice input means for inputting a voice signal having a pitch;

chord information input means for inputting a chord having a plurality of pitches;

pitch conversion means for converting the input voice signal into a pitch-converted voice signal having a pitch different from the pitch of the input voice signal, the pitch conversion means converting the pitch of the input voice signal in accordance with the chord information from the chord information input means and outputting the pitch-converted voice signal, the pitch conversion means converting the input voice signal so that the pitch different from the pitch of the input voice signal is at least one pitch of the plurality of pitches of the inputted chord; and means for combining the pitch-converted voice signal with the input voice signal;

the chord information input means comprising play information input means for inputting playing information and chord detection means for detecting the input chord from playing information inputted by the play information input means.

7. A method of voice processing comprising the steps of:

picking up a voice as a voice signal;

inputting chord information;

converting the voice signal into a pitch-converted voice signal having a pitch different from a pitch of the voice signal in accordance with the input chord information; and combining the pitch-converted voice signal with the picked up voice signal to add sound effects thereto;

the step of inputting chord information comprising the steps of inputting playing information and detecting the input chord information from the inputted playing information.

*8. A voice processor comprising:*

*a circuit for receiving a voice signal having a first pitch;*

*a playing information generator for providing playing information data for playing music, the playing information data including data representative of harmony information;*

*a tone generator for generating musical tone signals based upon the playing information data;*

*a pitch converter for converting the input voice signal to a pitch-converted voice signal having a second pitch different from the first pitch of the input voice signal in accordance with the harmony information the pitch converter utilizing a pitch conversion parameter related to a ratio of the first pitch to the second pitch; and*

*a circuit for combining the pitch converted voice signal with the input voice signal to provide a sound effect imparted to the input voice signal.*

*9. A voice processor according to claim 8, wherein the playing information generator further provides data representative of chord information as the data representative of harmony information.*

*10. A voice processor according to claim 8, wherein the playing information generator further includes:*

*a circuit for receiving playing information data; and*

*a chord detector for detecting chord information based on the input playing information data.*

*11. A voice processor according to claim 8, wherein the playing information generator further includes a chord information generator for providing sequential chord data based upon a progression of a piece of music, wherein the harmony information includes the chord data.*

*12. A voice processor according to claim 9, wherein the chord information includes a sequential progression of chords, the sequential progression of chords being based upon a piece of music, and wherein the pitch converter converts the input voice signal to a pitch-converted voice signal such that the second pitch includes a tone pitch corresponding to a pitch of a chord composing tone of each of the chords in the progression.*

*13. A voice processor according to claim 12, wherein the pitch converter includes a tone pitch shifter for shifting the tone pitch of the pitch-converted voice signal within a melody range such that a tone of the pitch-converted voice signal is in harmony with a tone of the input voice signal.*

*14. A voice processor according to claim 8, wherein a tone of the pitch converted voice signal is consonant with tones of the musical tone signals generated by the tone generator.*

*15. A voice processor comprising:*

*a circuit for receiving a voice signal having a first pitch;*

*a playing information generator for providing playing information data for playing music, the playing infor-*

*mation data including data representative of harmony information, the harmony information having at least one pitch in a time period;*

*a pitch shifter for shifting a pitch of the harmony information to provide a shifted pitch information signal that is set within a melody range;*

*a pitch converter for converting the input voice signal to a pitch-converted voice signal having a second pitch different from the first pitch, wherein the second pitch of the pitch-converted voice signal corresponds to the shifted pitch information signal; and*

*a circuit for combining the pitch converted voice signal with the input voice signal to provide a sound effect imparted to the input voice signal.*

*16. A voice processor according to claim 15, wherein the harmony information includes chord information.*

*17. A voice processor according to claim 16, wherein the chord information includes at least one pitch in a time interval and the pitch shifter shifts a pitch of the chord information to a pitch corresponding to a chord component pitch name of said chord information within a melody range which is closest to the first pitch of the input voice signal.*

*18. A voice processor according to claim 15, the voice processor further comprising a tone generator for generating tone signals based on the playing information data.*

*19. A voice processor comprising:*

*a circuit for receiving a voice signal having a first pitch;*

*a playing information generator for providing playing information data for playing music, the playing information data including data representative of harmony information, the harmony information including at least one harmony pitch in a time period within an accompaniment range;*

*a tone generator for generating tone signals based upon the playing information data; and,*

*a pitch converter for converting the input voice signal to a pitch-converted voice signal having a second pitch different from the first pitch of the input voice signal, the pitch converter utilizing a pitch conversion parameter related to a ratio of the first pitch to the second pitch, and the second pitch of the pitch-converted voice signal corresponding to the at least one harmony pitch, wherein a tone of the pitch converted voice signal is consonant with tones of the signals generated by the tone generator.*

*20. A voice processor according to claim 19, wherein the harmony information includes chord information.*

*21. A voice processor according to claim 20, wherein the chord information includes a plurality of chord composing pitches in a time period and the at least one harmony pitch is one or more of chord composing pitches of the chord information within an accompaniment range.*

*22. A voice processor according to claim 19, the voice processor further comprising a circuit for combining the pitch-converted voice signal with the input voice signal to provide a sound effect to the input voice signal.*

*23. A voice processor comprising:*

*a circuit for receiving a voice signal having a first pitch;*

*a pitch information generator for providing data representative of sequential pitches being sequentially changed in accordance with a progression of a musical piece;*

*a tone generator for generating tone signals based upon the data representative of the sequential pitches;*

*a pitch converter for converting the first pitch of the input voice signal to a second pitch different from the first pitch of the input voice signal in accordance with at least one of the sequential pitches to provide a pitch-converted voice signal, the pitch converter utilizing a pitch conversion parameter related to a ratio of the first pitch to the second pitch; and*

*a circuit for combining the pitch-converted voice signal with the input voice signal to provide a sound effect imparted to the input voice signal.*

*24. A voice processor according to claim 23, wherein the pitch information generator provides chord sequence data as the data representative of sequential pitches.*

*25. A voice processor according to claim 23, wherein the pitch information generator further includes:*

*a circuit for receiving playing information data; and*

*a chord detector for detecting chord information based on the input playing information data, wherein*

*the sequential pitches in accordance with the progression of the music piece are based upon the detected chord information.*

*26. A voice processor according to claim 23, wherein a tone of the pitch-converted voice signal is consonant with tones of the tone signals generated by the tone generator.*

*27. A voice processor comprising:*

*a circuit for receiving a voice signal having a first pitch;*

*a pitch detector for detecting the first pitch of the input voice signal;*

*a chord information generator for providing chord information data that varies with progression of a musical piece;*

*a tone generator for generating tone signals based upon the chord information data;*

*a pitch conversion parameter generator for providing a pitch conversion parameter based on the detected first pitch and the chord information data; and*

*a pitch converter for converting the first pitch of the input voice signal to a second pitch different from the first pitch of the input voice signal in accordance with the pitch conversion parameter to provide a pitch-converted voice signal having the second pitch.*

*28. A voice processor according to claim 27, the voice processor further comprising a circuit for combining the pitch converted voice signal with the input voice signal to provide a sound effect to the input voice signal.*

*29. A voice processor according to claim 27, wherein the chord information generator further includes:*

*a circuit for receiving playing information data; and*

*a chord detector for detecting chord information based on the playing information data.*

*30. A voice processor according to claim 27, wherein the chord information generator further includes a chord sequencer for providing a series of chord data as the chord information based upon the progression of the musical piece.*

*31. A voice processor according to claim 27, wherein a tone of the pitch-converted voice signal is consonant with tones of the tone signals generated by the tone generator.*

*32. A voice processor according to claim 27, wherein the chord information data includes data representative of at least one chord pitch and the pitch converter further includes a tone pitch shifter for shifting at least one pitch represented by the chord information to within a melody range such that a tone of the pitch-converted voice signal is consonant with the chord information and a melody of the music piece.*

*33. A voice processor according to claim 30, wherein the series of chord data is representative of information of a chord-type and a chord-root.*

*34. A voice processor according to claim 27, wherein the chord information generator retrieves the chord information data from a memory.*

*35. A voice processor according to claim 27, wherein the chord information generator provides the chord information data in response to an instrumental performance.*

*36. A voice processor according to claim 27, wherein the pitch conversion parameter represents the second pitch.*

*37. A voice processor according to claim 36, wherein the second pitch is within a melody range.*

*38. A voice processor according to claim 36, wherein the second pitch is within an accompaniment range.*

*39. A voice processor according to claim 27, wherein the pitch conversion parameter generator provides a plurality of pitch conversion parameters, and wherein the pitch converter further includes a plurality of pitch conversion devices, each pitch conversion device converting the first pitch of the input voice signal to a second pitch different from the first pitch in accordance with one of the pitch conversion parameters to provide one of a plurality of pitch-converted voice signals.*

*40. A voice processor comprising:*

*a circuit for receiving a voice signal having a first pitch;*

*a chord information terminal for receiving chord information data representative of information for at least one of a chord-type and a chord-root in accordance with a progression of a musical piece;*

*a pitch converter for converting the first pitch of the input voice signal to a second pitch different from the first pitch of the input voice signal based on the detected first pitch and the chord information data to provide a pitch-converted voice, signal having the second pitch; and*

*a circuit for combining the pitch converted voice signal with the input voice signal to provide a sound effect to the input voice signal.*

*41. A voice processor according to claim 40, the voice processor further comprising a tone generator for generating tone signals based on the chord information data, wherein a tone of the pitch-converted voice signal is consonant with tones of the tone signals generated by the tone generator.*

*42. A voice processor comprising:*

*a circuit for receiving a voice signal having a first pitch;*

*a playing information generator for providing playing information data for playing music including harmony information, the harmony information varying in accordance with a progression of the music;*

*a tone generator for generating musical tone signals based upon the playing information data;*

*a pitch converter for converting the input voice signal to a pitch-converted voice signal having a second pitch different from the first pitch of the input voice signal in accordance with the harmony information; and*

*a circuit for combining the pitch-converted voice signal with the input voice signal to provide a sound effect imparted to the input voice signal, wherein a waveform of the pitch-converted voice signal is made from a waveform of the input voice signal.*

*43. A voice processor comprising:*

*a circuit for receiving a voice signal having a first pitch;*

*a playing information generator for providing playing information data for playing music including harmony information, the harmony information varying in accordance with a progression of the music, wherein the harmony information is set within an accompaniment range;*

*a tone generator for generating tone signals based upon the playing information data; and*

*a pitch converter for converting the input voice signal to a pitch-converted voice signal having a second pitch different from the first pitch in accordance with the harmony information, wherein a tone of the pitch-converted voice signal is consonant with tones of the tone signals generated by the tone generator.*

*44. A voice processor comprising:*

*a circuit for receiving a voice signal having a first pitch;*

*a pitch information generator for providing data representative of sequential pitches being sequentially changed in accordance with a progression of a musical piece;*

*a tone generator for generating tone signals based upon the data representative of the sequential pitches;*

*a pitch converter for converting the first pitch of the input voice signal to a second pitch different from the first pitch in accordance with at least one of the sequential pitches to provide a pitch-converted voice signal; and*

*a circuit for combining the pitch-converted voice signal with the input voice signal to provide a sound effect imparted to the input voice signal wherein a waveshape of the pitch-converted voice signal is made of a waveshape of the input voice signal.*

*45. A voice processor comprising:*

*a circuit for receiving a voice signal having a first pitch;*

*a playing information generator for providing playing information data for playing automatic performance music including harmony information, the harmony information varying in accordance with a progression of the automatic performance music;*

*a tone generator for generating musical tone signals based upon the playing information data;*

*a pitch converter for converting the input voice signal to a pitch-converted voice signal having a second pitch different from the first pitch of the input voice signal in accordance with the harmony information; and*

*a circuit for combining the pitch-converted voice signal with the input voice signal to provide a sound effect imparted to the input voice signal wherein a waveshape of the pitch-converted voice signal is made of a waveshape of the input voice signal.*

*46. A voice processor comprising:*

*a circuit for receiving a voice signal having a first pitch;*

*a pitch detector for detecting the first pitch of the input voice signal;*

*a chord information terminal for receiving chord information data representative of information for at least one of a chord-type and a chord-root in accordance with a progression of a musical piece;*

*a pitch converter for converting the first pitch of the input voice signal to a second pitch different from the first pitch in accordance with the chord information data to provide a pitch-converted voice signal having the second pitch; and*

*a circuit for combining the pitch-converted voice signal with the input voice signal to provide a sound effect imparted to the input voice signal, wherein a waveform of the pitch-converted voice signal is made from a waveform of the input voice signal.*

* * * * *